United States Patent
Coonce et al.

(10) Patent No.: US 7,336,169 B2
(45) Date of Patent: Feb. 26, 2008

(54) METHOD AND REAL TIME EMERGENCY RESPONSE SURVEILLANCE SYSTEM

(75) Inventors: Charles Kevin Coonce, Parma, MI (US); Mark James Maloney, Jackson, MI (US)

(73) Assignees: Lake Star Consulting LLC, Northfield, IL (US); Emergency Medical Systems, Inc., Parma, MI (US)

( * ) Notice: Subject to any disclaimer, the term of this patent is extended or adjusted under 35 U.S.C. 154(b) by 99 days.

(21) Appl. No.: 11/087,968

(22) Filed: Mar. 23, 2005

(65) Prior Publication Data

US 2006/0214787 A1 Sep. 28, 2006

(51) Int. Cl.
*G08B 1/08* (2006.01)
(52) U.S. Cl. ............................ 340/539.25; 340/539.22; 340/531; 340/506; 340/517; 348/143
(58) Field of Classification Search ................ 340/531, 340/506, 507, 539.25, 539.22, 505, 517, 340/500; 348/154, 159, 143, 152, 153, 155
See application file for complete search history.

(56) References Cited

U.S. PATENT DOCUMENTS

| | | | |
|---|---|---|---|
| 4,673,974 A | 6/1987 | Ito et al. | |
| 4,992,866 A | 2/1991 | Morgan | |
| 5,382,943 A * | 1/1995 | Tanaka | ................... 340/539.22 |
| 6,069,655 A * | 5/2000 | Seeley et al. | ................ 348/154 |
| 6,094,213 A | 7/2000 | Mun et al. | |
| 6,281,790 B1 | 8/2001 | Kimmel et al. | |
| 6,317,039 B1 * | 11/2001 | Thomason | ................... 340/505 |
| 6,400,265 B1 | 6/2002 | Saylor | |
| 6,538,689 B1 | 3/2003 | Chang | |
| 6,665,004 B1 | 12/2003 | Paff | |
| 6,697,103 B1 | 2/2004 | Fernandez | |
| 6,720,990 B1 | 4/2004 | Walker | |
| 6,975,220 B1 * | 12/2005 | Foodman et al. | ........... 340/531 |
| 2002/0176019 A1 | 11/2002 | Wesselink | |
| 2003/0062997 A1 | 4/2003 | Naidoo | |
| 2003/0227540 A1 | 12/2003 | Monroe | |
| 2004/0105005 A1 | 6/2004 | Yamamoto | |

* cited by examiner

*Primary Examiner*—Anh V. La
(74) *Attorney, Agent, or Firm*—Schwartz Cooper Chartered

(57) ABSTRACT

A real time emergency response surveillance system, a method, and a computer readable medium for storing a computer program for responding to an emergency situation are disclosed. The real time emergency response surveillance system includes one or more surveillance stations communicatively coupled to an operations center. Each surveillance station includes a controller, a video camera, a communication module and a display screen. The surveillance station is placed in one of a surveillance mode and an emergency response mode. Real time video data is transmitted from the surveillance station to the operations center in both the surveillance mode and the emergency response mode. Real time video data is received from the operations center at the surveillance station in emergency response mode. The real time video data received at the surveillance station is displayed on a display screen in emergency response mode.

48 Claims, 6 Drawing Sheets

METHOD AND REAL TIME EMERGENCY RESPONSE SURVEILLANCE SYSTEM

FIELD OF THE INVENTION

The present invention relates generally to a surveillance system. In particular, the invention relates to a method and system for providing a surveillance station where a two-way real time audio/video communication channel is established between the surveillance station and an operations center in the event of an emergency situation.

BACKGROUND OF THE INVENTION

Emergency situations often require the immediate implementation of appropriate emergency procedures to minimize injuries and loss of human life. For example, in the event of a building emergency, such as for example a fire, providing immediate effective professional guidance to the building occupants during a building evacuation may save lives. Also in the event of large scale emergencies, such as for example, a hurricane, an earthquake or tornado, providing prompt warnings and guidance via direct communication with the people in the vicinity of the emergency situation may be instrumental in minimizing panic and guiding people in the vicinity of the emergency situation to locations of greater safety.

Public areas are sometimes placed under surveillance and monitored by live personnel at remote monitoring centers. However, in the event of an emergency, personnel at the monitoring centers do not typically themselves provide guidance to the people in the vicinity of the emergency situation. Such monitoring centers may contact an emergency response facility, such as for example, the police department or fire department to respond to the emergency situation. Strategically placed emergency telephones may be available to a user to request emergency assistance in the event of an emergency situation. However, the locations of such telephones may not be readily known to customers, guests or other visitors present at the facility. In addition, the oral information that might be conveyed to and from the user in an emergency is limited to the communication skills of the user and the emergency personnel recipient at the other end of the phone line and the audio quality of their communications. Visitors such as tourists may not speak the same language as the emergency personnel. In emergencies, environment noise levels and/or hearing loss suffered by the user in the emergency may greatly impede the flow of useful information.

In addition, and depending on the severity of the emergency, the user of one-way real-time surveillance systems described above may not be able to speak or communicate with enough length or clarity to provide the needed information to the emergency monitoring personnel. Smoke and other conditions may impair the unprotected user's breathing due to contamination of the ambient air at the emergency site, thus inhibiting or foreclosing meaningful oral communications from the emergency user's location.

In order to overcome some of these potential disadvantages, others have suggested surveillance systems involving audio communication and one-way real-time video surveillance whereby an emergency monitoring person can view conditions at the location of the emergency user. See, e.g. U.S. Patent Application Publication No. US 2003/0227540 and U.S. Pat. No. 6,538,689. While these types of one-way real-time video surveillance systems may provide some useful information to the emergency personnel, the persons present at the emergency site must rely on the quality of the communication from the emergency personnel. Such limitations prevent, for example, display of location maps, exits, and best exit route(s) to the user. In addition, if the user does not share a common language with the emergency personnel the former's requests and the latter's instructions may be meaningless.

It is desirable, therefore, to provide systems and methods for responding to an emergency situation that overcomes one or more of the prior art limitations described above.

SUMMARY OF THE INVENTION

One aspect of the present invention provides a surveillance station including a controller communicatively coupled to a video camera, a communication module and a display screen. The controller is operable to place the surveillance station in one of a surveillance mode and an emergency response mode. The communication module is operable to transmit real time video data from the video camera to an operations center in both the surveillance mode and the emergency response mode and to receive real time video data from the operations center in the emergency response mode. The display screen is operable to display the received real time video data.

Another aspect of the invention provides a method of responding to an emergency situation using a surveillance station. The method includes placing a surveillance station in one of a surveillance mode and an emergency response mode, transmitting real time video data from the surveillance station to an operations center in both the surveillance mode and the emergency response mode, receiving real time video data from the operations center at the surveillance station in the emergency response mode, and displaying the received real time video data on a display screen in the emergency response mode.

Another aspect of the invention provides a computer readable medium for storing a computer program for responding to an emergency situation using a surveillance station. The computer program includes computer readable code for placing a surveillance station in one of a surveillance mode and an emergency response mode, computer readable code for transmitting real time video data from the surveillance station to an operations center in both the surveillance mode and the emergency response mode, computer readable code for receiving real time video data from the operations center at the surveillance station in the emergency response mode, and computer readable code for displaying the received real time video data on a display screen in the emergency response mode.

Another aspect of the invention provides a real time emergency response surveillance system. The system includes a plurality of surveillance stations where each of the plurality of surveillance station is operable to be individually and selectively placed in one of an emergency response mode and a surveillance mode and an operations center communicatively coupled to the plurality of surveillance stations, wherein a first of the plurality of surveillance stations is operable to transmit real time video data from the first surveillance station to an operations center in both the emergency response mode and the surveillance mode, and wherein the first surveillance station is operable to receive real time video data from the operations center in emergency response mode.

BRIEF DESCRIPTION OF THE DRAWINGS

The present invention is illustrated by way of example and not limited in scope to the accompanying figures, in which like references indicate similar elements, and in which.

DETAILED DESCRIPTION OF THE PREFERRED EMBODIMENTS

Figure 1:
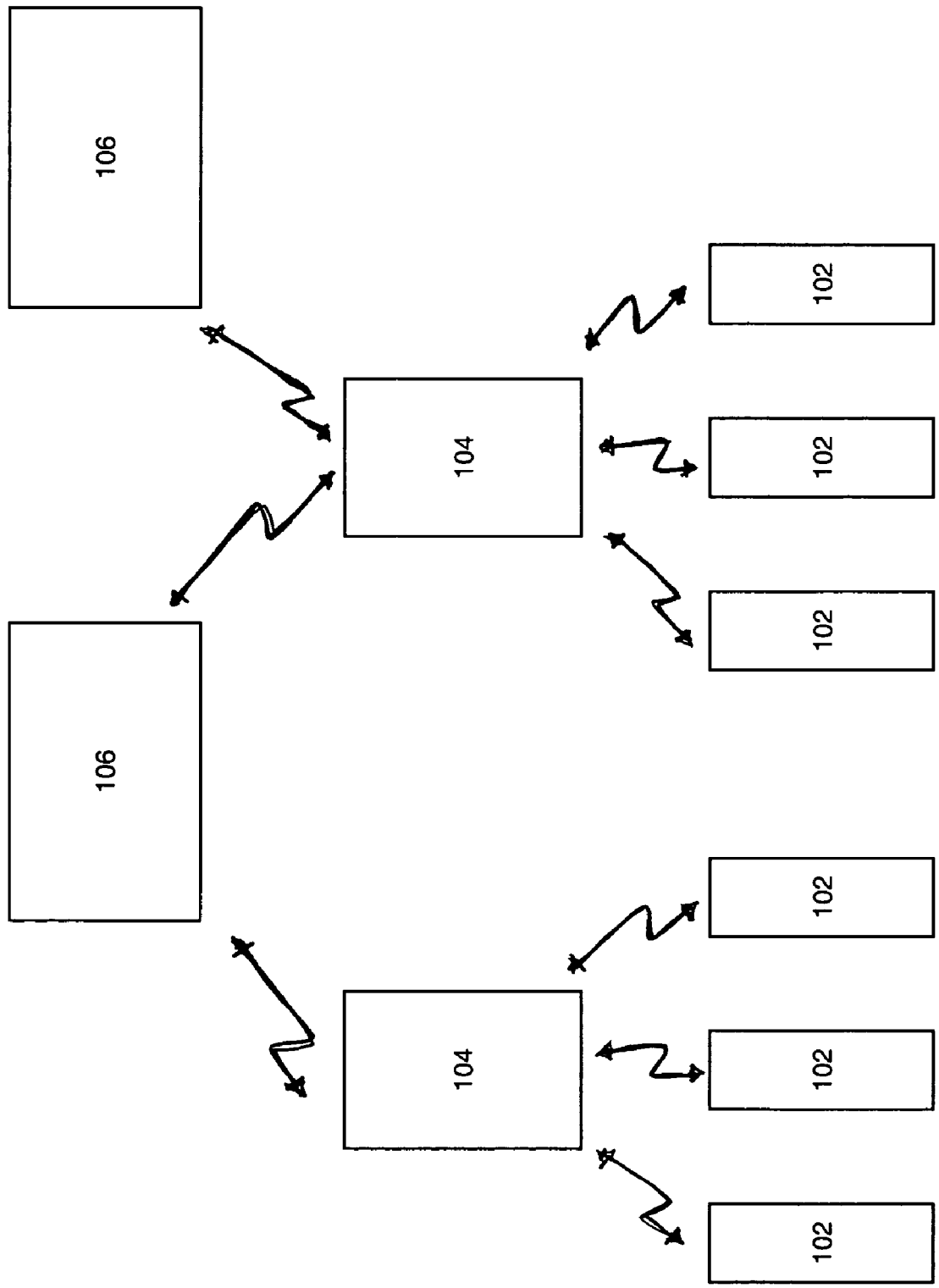
FIG. 1 is a schematic block diagram of an embodiment of a real time emergency response surveillance system in accordance with the principles of the present invention.

FIG. 1 is a schematic diagram of one embodiment of a real time emergency response surveillance system 100, in accordance with the principles of the present invention. The real time emergency response surveillance system 100 includes one or more standalone surveillance stations 102 and one or more operations centers 104. Each operations center 104 is communicatively coupled to one or more surveillance stations 102. In one embodiment, one or more of the operations centers 104 are communicatively coupled to one or more emergency response centers 106.

In one embodiment, each surveillance station 102 is configured to transmit and receive audio and video data to and from an operations center 104 via communication networks that enable high speed audio and video communication. Examples of such communication systems include, but are not limited to, T1 line, T3 line, OC3 fiber, OC12 fiber, OC48 fiber, OC192 fiber, digital subscriber line (DSL) or any other high speed communication lines that may be apparent to one having ordinary skill in the art. A combination of wired and wireless communications networks may also be employed without departing from the spirit of the invention.

In another embodiment each surveillance station 102 is configured to transmit and receive audio data and video data to and from an operations center 104 via a satellite communication network. The surveillance station 102 may be communicatively coupled to a router via a wired communication link, a wireless communication link or a combination wired and wireless communication link. The router may be communicatively coupled to the satellite dish via a wired communication link, a wireless communication link or a combination wired and wireless communication link. The operations center 104 may include one or more operations center advisor stations. Each operations center advisor station may be communicatively coupled to the router via a wired communication link, a wireless communication link or a combination wired and wireless communication link. The router may be communicatively coupled to the satellite dish via a wired communication link, a wireless communication link or a combination wired and wireless communication link.

In one embodiment, one or more of the operations centers 104 are communicatively coupled to an emergency response center 106. Each operations center 104 is configured to receive audio and video data from an emergency response center 106 via communication networks that enable high speed audio and video communication. Examples of such communication systems include, but are not limited to, T1 line, T3 line, OC3 fiber, OC12 fiber, OC48 fiber, OC192 fiber, digital subscriber line (DSL) or any other high speed communication lines that may be apparent to one having ordinary skill in the art. A combination of wired and wireless communications networks may also be employed without departing from the spirit of the invention.

In another embodiment one or more of the operations centers 104 is configured to receive audio data and video data from one or more emergency response centers 106 via a satellite communication network. The operations center 104 may be communicatively coupled to a router via a wired communication link, a wireless communication link or a combination wired and wireless communication link. The router may be communicatively coupled to the satellite dish via a wired communication link, a wireless communication link or a combination wired and wireless communication link. The emergency response center 106 may be communicatively coupled to the router via a wired communication link, a wireless communication link or a combination wired and wireless communication link. The router may be communicatively coupled to the satellite dish via a wired communication link, a wireless communication link or a combination wired and wireless communication link.

In one presently preferred embodiment, each of the surveillance stations 102 can be placed in one of two operating modes: a surveillance mode and an emergency response mode. The surveillance mode is the default surveillance station 102 operating mode. In one embodiment, when a surveillance station 102 is in surveillance mode, surveillance video cameras and microphones are active and real time audio/video data is continuously transmitted from the surveillance station 102 to the operations center 104 for real time evaluation by one or more operations center advisors. In another embodiment, the surveillance camera is active and real time video is transmitted from the surveillance station 102 to the operations center 104 in surveillance mode. The operations center 104 is preferably staffed with one or more operations center advisors around the clock. The operations center advisors may include specialists, such as for example, building security experts, medical experts and/or other specialists that specialize in responding to different types of emergency situations.

User interest data may be displayed on a surveillance station display screen in surveillance mode. In one embodiment, the operations center 104 selects and transmits the selected user interest data to the surveillance station 102 for display at individual surveillance stations 102. In another embodiment, a content distribution center coordinates the organization and transmission of selected user interest data for individual surveillance stations. The received user interest data is stored locally at the surveillance station 102. The selected user interest data may depend upon the location of that surveillance station 102 and on the specific requests of the entity authorizing the placement of the surveillance station 102. For example, a surveillance station 102 located in a bank may display user interest data directed to banking needs. Alternatively, if the station is located in a retail space, such as a shopping mall or large store, advertisements of the store(s) and other commercial facilities and their respective goods and services may be displayed on the screen. Stations located in areas frequented by tourists may display historical and local interest information, including displays in several different languages.

The display of user interest data at a surveillance station 102 may unobtrusively and/or attractively draw the attention of people passing by a surveillance station 102 to the location, availability and nature of the surveillance station 102 in a non-emergency environment. This increases the probability that people will recall the location and availability of the surveillance station 102 in the event of an emergency situation. Further, such unobtrusive attraction may facilitate clearer video surveillance of an individual's appearance in certain embodiments of the present invention. Such information may be useful in the event that subsequent events require identification of individuals present at the location, such as identification of airline passengers or visitors at government or public facilities that may later become sites of emergency situations, or children that become separated from their care-givers.

The operations center 104 can transmit notification messages to selected surveillance stations 102. When a surveillance station 102 receives a notification message from the operations center 104, the notification message is displayed on the surveillance station display screen and a notification alarm is activated to attract attention to that surveillance station 102. The notification messages may be, for example, building safety messages. In one embodiment, the operations center 104 can simultaneously transmit different notification messages to different surveillance stations 102 for display on the surveillance station display screens. In one embodiment, the notification messages may be customized based on the location of a surveillance station 102.

In the event of an emergency situation that requires immediate implementation of emergency procedures, such as for example, a building evacuation, the operations center 104 places all of the surveillance stations 104 in the area affected by the emergency situation in emergency response mode. An alarm system is activated at each of the surveillance stations 102 that have been placed in emergency response mode to draw attention to that surveillance station 102. A two way real time audio/video communication channel is immediately established between each of the surveillance stations 102 in emergency response mode and the operations center 104. Real time audio/video data continues to be transmitted from the surveillance station 102 to the operations center 104. Real time audio/video data of a live operations center advisor is transmitted from the operations center 104 and displayed on the surveillance station display screen in emergency response mode. The operations center advisor instructs the people in the vicinity of the surveillance station 102 regarding the appropriate emergency safety and/or evacuation procedures. Depending on the nature of the emergency, such information may include oral and/or visual information as to the nearest safe exit or refuge or evacuation route(s) away from the emergency. Different operations center advisors may interface with different surveillance stations 102 and provide location specific instructions.

In one embodiment, the operations center 104 can establish a communications channel between selected surveillance stations 102 and an emergency response center 106 via the operations center 104. The operations center 104 routes real time audio/video of an emergency specialist received from the emergency response center 106 to the appropriate surveillance stations 102. Examples of emergency response centers 106 include but are not limited to, the fire department, the police department, local hospitals and any government agency, such as for example, Homeland Security. National or international agencies may also be connected to the notification system, such as earthquake, weather, flood and Tsunami warning organizations.

One or more surveillance stations 102 are strategically placed throughout a designated area to facilitate security monitoring of the premises or area and to enable operations center advisors to provide effective emergency specific guidance to persons on the premises. The surveillance stations 102 maybe used to monitor areas, such as for example, public and private buildings, indoor stadiums, outdoor stadiums, sports arenas, concert halls, museums, amusement parks, beaches, national monuments and important government or historic sites. The surveillance stations 102 may be, for example, strategically placed throughout a building to monitor building security and provide interactive emergency specific guidance in the event of an emergency situation. For example, operations center advisors may provide building evacuation guidance in the event of a fire in the building. If located out of doors, the advisors may provide maps of appropriate exit or evacuation routes or directions to medical and first aid treatments centers, or to locations or food, water and transportation distribution centers. It should be noted while a number of examples of placement sites for the surveillance stations 102 have been described, the real time surveillance emergency response system 100 can be implemented in any area where emergency response guidance may be necessary to promote individual safety in the event of an emergency situation.

Figure 2:
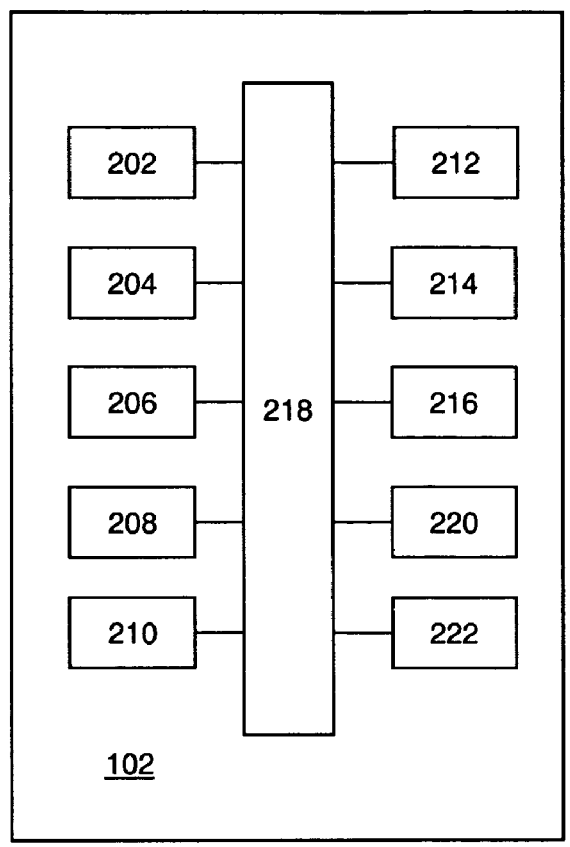
FIG. 2 is a schematic block diagram of an embodiment of an operations center in accordance with the principles of the present invention.

Referring to FIG. 2, a schematic block diagram of another preferred embodiment of a surveillance station 102 in accordance with the principles of the present invention is shown. The surveillance station 102 includes a controller 202 that is communicatively coupled to a local memory 204, a communication module 206, a display screen 208, a video camera 210, a microphone 212, one or more speakers 214, and an alarm system 216 via a network 218. In one embodiment, the surveillance station 102 includes a global positioning (GPS) unit 220.

In one embodiment, the controller 202 is a digital signal processor (DSP). In another embodiment the processor may be implemented as a microcontroller, microprocessor, controller, host processor, or communications processor. The processor may be implemented as an application specific integrated circuit (ASIC). In another embodiment, the processor may be implemented as a processor working in conjunction with a central processing unit (CPU) performing the function of a general purpose processor. The processor executes various computer programs that control programming and operational modes of electronic and mechanical systems within the surveillance station 102, and communications via the communication module 206.

The communication module 206 includes a transmitter and a receiver. The transmitter transmits the real time video data recorded by the video camera 210 and the real time audio data picked up by the microphone 212 from the surveillance station 102 to the operations center 104. The receiver receives communication data from the operations center 104 including real time audio/video data of the operations center advisor. The received video data is displayed in real time on the display screen 208 and the received audio data is transmitted in real time via the speakers 214.

In one embodiment the display screen 208 is a cathode ray tube (CRT) display. In another embodiment, the display screen 208 is a liquid crystal (LCD) display. While a number of types of display screens 208 have been described other types of display screens 208 are also considered to be within the scope of the invention. The display screen 208 may be communicatively coupled to the controller 202 via a wired or wireless communication network.

The video camera 210 is strategically positioned to achieve site specific surveillance objectives. In one embodiment, the video camera 210 is positioned on a rotating base to provide maximum coverage of the area under surveillance. In another embodiment, the operations center advisor can remotely control the position of the video camera 210. In another embodiment, the video camera 210 is located remotely from the surveillance station 102 and is communicatively coupled to the controller 202 and the communication module 206 via a wired or wireless communication network.

The alarm system 216 is activated when the surveillance station 102 receives a notification message or when the operations center 104 places the surveillance station 102 in emergency response mode. The controller 202 coordinates the activation of the alarm system 216. In one embodiment, the alarm system 216 includes a siren. In another embodiment, the alarm system 216 includes a strobe light. In another embodiment, the alarm system 216 consists of a combination of a siren and a strobe light. In a preferred embodiment, the alarm system 216 includes a siren, a red strobe light and a blue strobe light.

In one embodiment, the controller 202 activates the blue strobe light when the surveillance station 102 receives a notification message. In one embodiment, the blue strobe light is activated for a pre-defined period of time following the receipt of the notification message from the operations center 104. In one embodiment, the pre-defined period of time is approximately ten seconds.

In one embodiment, the controller 202 activates the red strobe light, the blue strobe light and the siren when the operations center 104 places the surveillance station 102 in emergency response mode. The alarm system 216 remains activated until the surveillance station 102 is reset by the operations center 104. The operations center 104 resets the surveillance station 102 once the operations center determines that the emergency situation has been resolved or abated. It should be noted that while a number of different alarm systems 216 have been described, other types of alarm systems 216 are also considered to be within the scope of the invention.

In one embodiment, the surveillance station 102 includes a back up power supply (not shown). The back up power supply is activated responsive to a failure of the primary power supply powering the surveillance station 102. In one embodiment, the back up power supply has the capacity to power the surveillance station 102 for approximately an hour.

Figure 3:
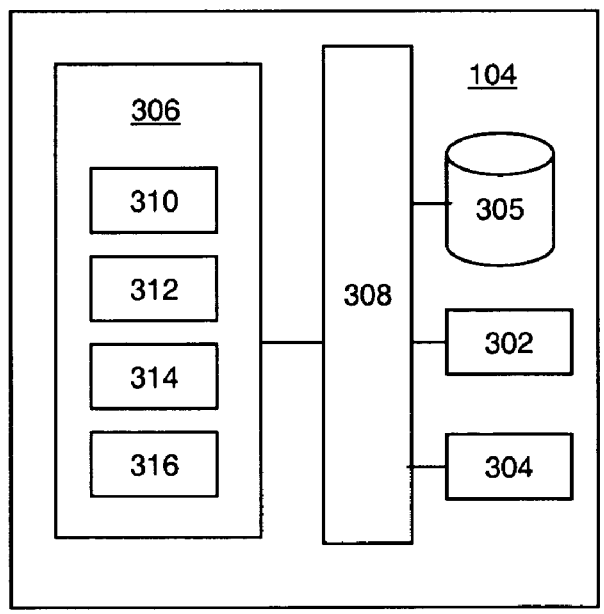
FIG. 3 is a schematic block diagram of an embodiment of a surveillance station in accordance with the principles of the present invention.

Referring to FIG. 3, a schematic block diagram of a preferred embodiment of an operations center 104 in accordance with the principles of the present invention is shown. The operations center 104 includes a operations controller 302, one or more communication modules 304, one or more operations databases 305, and one or more operations center advisor stations 306 communicatively coupled via a network system 308. Each operations center advisor station 306 is equipped with a video camera 310, a display screen 312, a microphone 314 and one or more speakers 316.

In one embodiment, the operations controller 302 is a digital signal processor (DSP). In another embodiment the processor may be implemented as a microcontroller, microprocessor, controller, host processor, or communications processor. The processor may be implemented as an application specific integrated circuit (ASIC). In another embodiment, the processor may be implemented as a processor working in conjunction with a central processing unit (CPU) performing the function of a general purpose processor. The processor executes various computer programs that control programming and operational modes of electronic and mechanical systems within the operations center 104 and manages the flow of audio/video into and out of the operations center 104.

The communication module 304 includes a transmitter and a receiver. The transmitter transmits the real time video data recorded by the video camera 310 and the real time audio data picked up by the microphone 314 from operations center advisors station to the surveillance station 102. The receiver receives the real time audio/video data from the surveillance stations 102. The operations controller 302 routes the received audio/video data to the appropriate operations center advisors station 306 for display on the display screen 312 and for transmission via the speakers 316.

All of the real time audio/video data received at the operations center 104 from the one or more surveillance stations 102 and all of the real time audio/video data transmitted from the operations center 104 to a surveillance station 102 is stored in the operations database 305.

In one embodiment the display screen 312 is a cathode ray tube (CRT) display. In another embodiment, the display screen 312 is a liquid crystal (LCD) display. While a number of types of display screens 312 have been described other types of display screens 312 are also considered to be within the scope of the invention. The display screen 312 may be communicatively coupled to the operations controller 302 via a wired or wireless communication network.

Figure 4A:
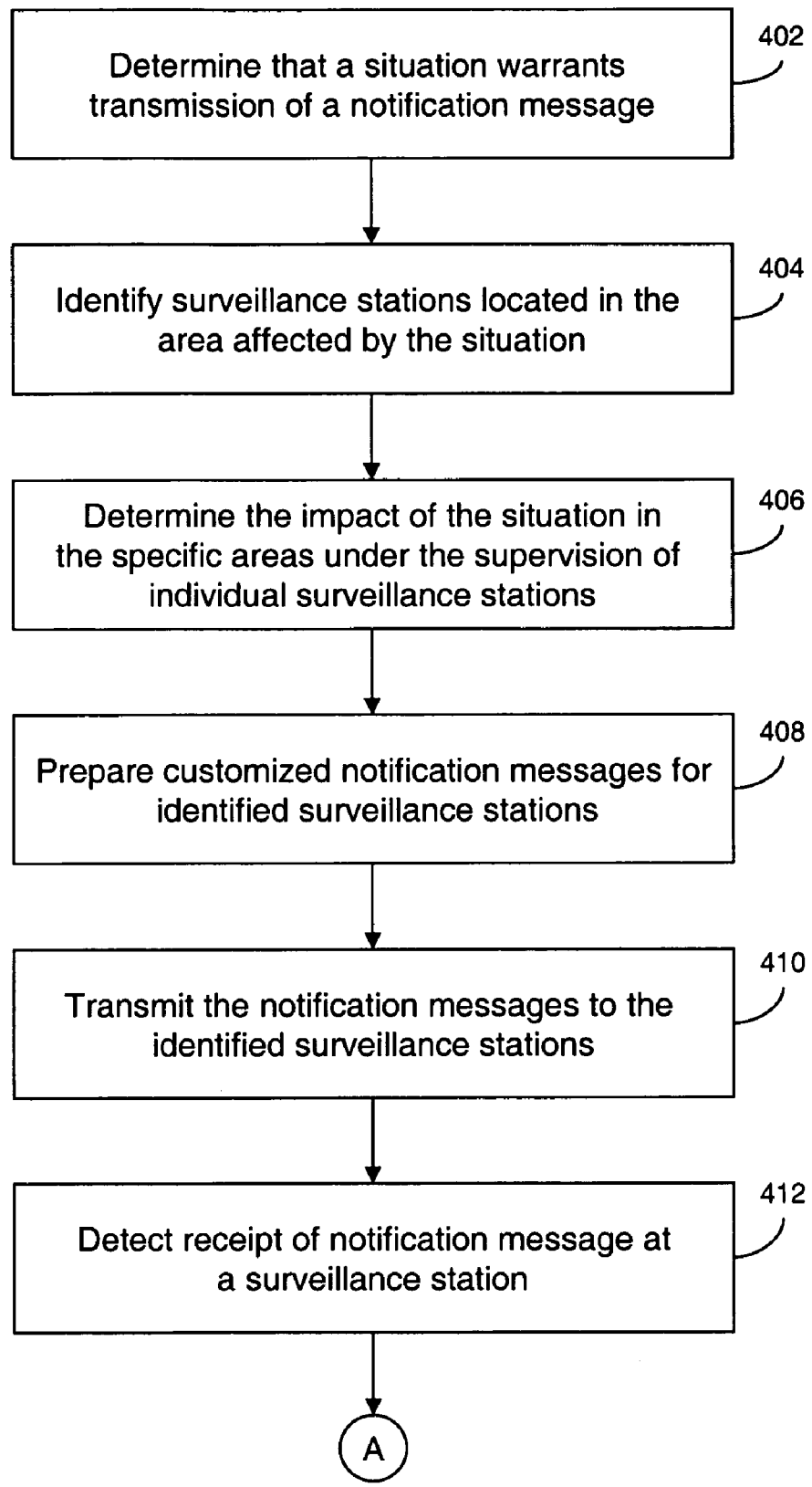
FIG. 4 a-b is a flowchart of one embodiment of a method for displaying a notification message at a surveillance station in accordance with the principles of the present invention.
Figure 4B:
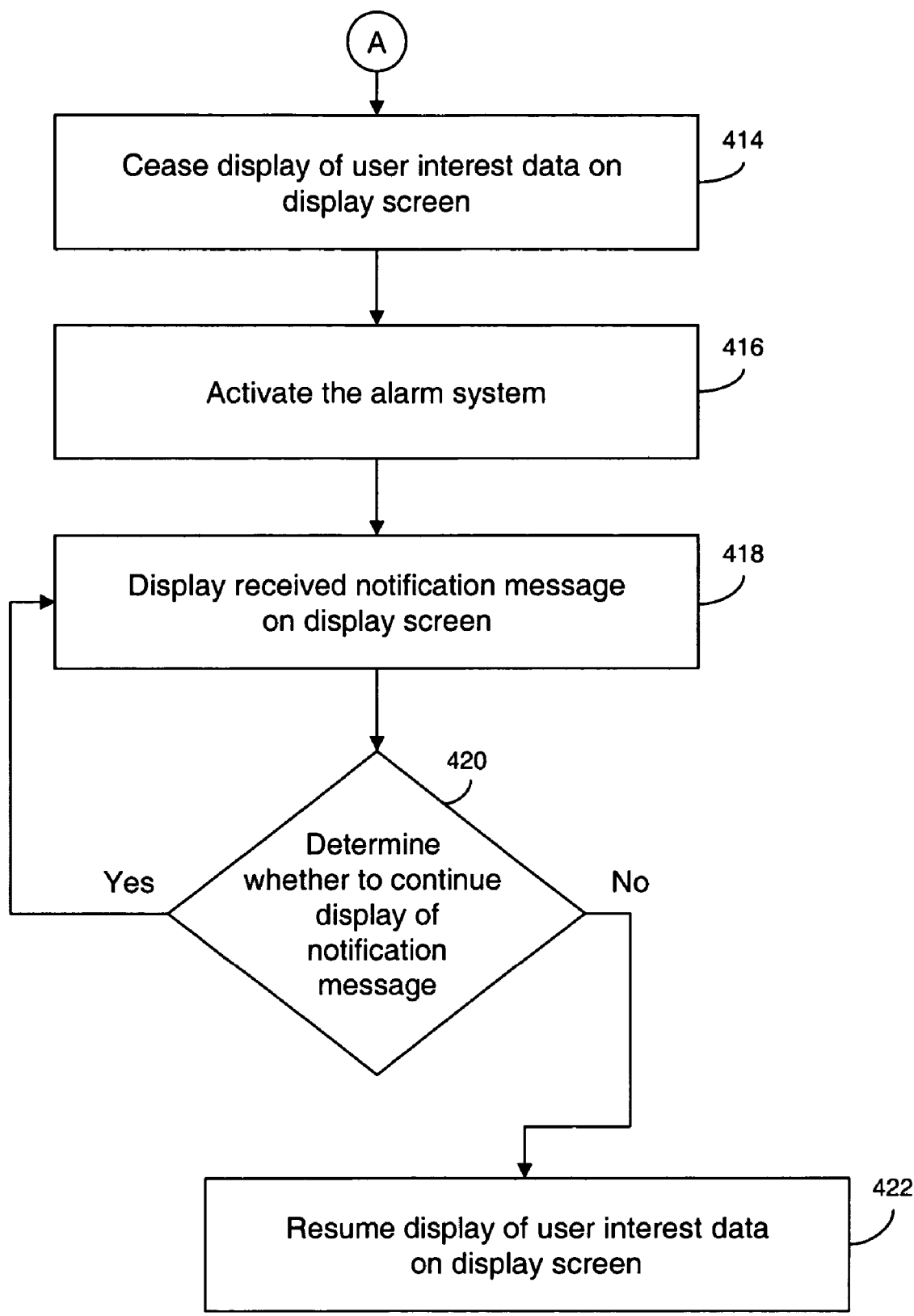

Referring to FIG. 4, a flowchart of a presently preferred embodiment of a method for displaying a notification message at the surveillance station 400 in accordance with the principles of the present invention is shown.

When the surveillance station 102 is operating in surveillance mode, in one preferred embodiment, user interest data is displayed on the display screen 208. In the event an operations center 104 identifies a need to display a notification message at a particular surveillance station 102 located in the area under surveillance of that operations center 104, the operations center 104 configures and transmits a notification message to the selected surveillance stations 102. Examples of notification messages may include, but are not limited to, notices of an elevator under repair, a fire drill, and any other type of notice that the operations center 104 determines warrants bystander attention in the vicinity of the surveillance station 102.

The method begins at step 402 with an operations center advisor determining that a situation exists that may warrant the transmission of one or more notification messages to warn bystanders in the areas affected by the situation. At step 404, the operations center advisor identifies the one or more surveillance stations 102 that are located in the area affected by the situation. The operations center advisor determines the impact of the situation on the individual areas under the surveillance of individual surveillance stations 102 at step 406 and prepares customized notification messages for each of the surveillance stations 102 based on the impact of the situation in the vicinity of individual surveillance stations at step 408. The operations center advisor transmits the customized notification messages to the one or more identified surveillance stations 102 at step 410. It should be noted that while the method describes the creation and transmission of customized notification messages to individual surveillance stations 102, the creation and transmission of a single notification message addressing a situation to all of the surveillance stations 102 in the area affected by the situation is also considered to be within the scope of the invention.

In one embodiment, the operations center 104 maintains a notification message database, containing one or more pre-drafted notification messages designed to address a number of commonly faced situations in the areas under the surveillance of that operations center 104. In the event, one of the areas under the surveillance of the operations center 104 experiences such a commonly faced situation, the operations center advisor retrieves the pre-drafted notification message best suited to address the situation at hand and transmits the retrieved notification message to the surveillance stations 102 located in the area affected by the situation.

The surveillance stations 102 identified as being in the area affected by the situation receive the notification message at step 412. The controller 202 issues the appropriate commands to cease the display of user interest data on the display screen 208 at step 414 and issues a command to activate components of the alarm system 216 at step 416. In one embodiment, the notification alarm system 216 comprises a siren and a strobe light. In one embodiment, the strobe light is a blue strobe light. In one embodiment, the notification alarm system 216 is activated for a pre-defined period of time. In one embodiment, the notification alarm system 216 is activated for approximately ten seconds. While one example of a notification alarm system 216 has been described, alternative types of alarms are also considered to be within the scope of the invention.

The controller 202 displays the received notification message on the display screen 208 at step 418. At step 420 the controller 202 determines whether to continue to display the notification message on the display screen 208.

In one embodiment, the notification message transmission includes display instructions embedded in the notification message transmission. Upon receipt of the notification message transmission, the controller 202 retrieves the embedded display instructions and displays the received notification message in accordance with the associated display instructions. In one embodiment, the display instructions define a specific display time period. In another embodiment, the display instructions define a start time and end time for the display of the notification message. If the controller 202 determines that the display instructions indicate that the notification message should continue to be displayed, the controller 202 continues to display the notification message on the display screen 208 and returns to step 418. If the controller 202 determines that the display instructions indicate that the notification message should no longer be displayed, the controller 202 ceases to display the notification message and resumes display of the user interest data on the display screen 208 at step 422.

In another embodiment, the operations center 104 transmits a cease display signal to the surveillance station 102 when it determines that there is no longer a need to continue the display of the notification message. If the controller 202 does not detect a cease display signal, the controller 202 continues to display the notification message on the display screen 208 at step 418. If the controller 202 determines that a cease display signal has been received, the controller 202 ceases to display the notification message and resumes display of the user interest data on the display screen 208 at step 422.

In another embodiment, the notification message is transmitted to all the surveillance stations 102 under the control of the operations center 104. The notification message transmission includes the addresses of the target surveillance stations 102 embedded within the notification message transmission. Each controller 202 at each surveillance station 102 reviews the received notification message transmission to determine whether the notification message is addressed to that particular surveillance station 102. If the controller 202 determines that the notification message is addressed to that surveillance station 102, the controller 202 issues the appropriate commands to display the notification message on the display screen 208 at that surveillance station 102. If the controller 202 determines that the notification message is not addressed to that particular surveillance station 102, the controller 202 ignores the notification message and continues to display user interest data on the display screen 208.

In another embodiment, the surveillance station 102 continues to display the user interest data upon receipt of a notification message from the operations center 104 and displays the notification message in the conjunction with the user interest data. An example of such a format, includes but is not limited to, displaying the notification message as a running footer in a lower section of the display area of the display screen 208.

While a particular sequence of steps have been described above, it should be noted that a method 400 having substantially similar steps or steps in a different sequence are also considered to be within the scope of the invention.

In the event of an emergency situation requiring the implementation of emergency procedures, such as for example, a building evacuation, the operations center 104 issues an emergency signal to all of the surveillance stations 104 in the area affected by the emergency situation. The controller 202 places the surveillance station 102 in emergency response mode responsive to the received emergency signal. A real time audio/video communication channel is established between the surveillance station 102 and the operations center 104 to enable the transmission of audio/video data from the operations center 104 to the surveillance station 102 thereby creating a two way real time audio/video communication channel between the surveillance station 102 and the operations center 104. An operations center advisor at the operations center 104 can assess the impact of the emergency situation in the vicinity of the surveillance station 102 based on the audio/video data received from the surveillance station 102. The operations center advisor provides live audio/video emergency response guidance to the people in the area. Based on a review of the audio/video data feedback received from the surveillance station 102 location, the emergency response guidance can be responsively modified to adjust to potentially changing circumstances at the location of the surveillance station 102.

Figure 5A:
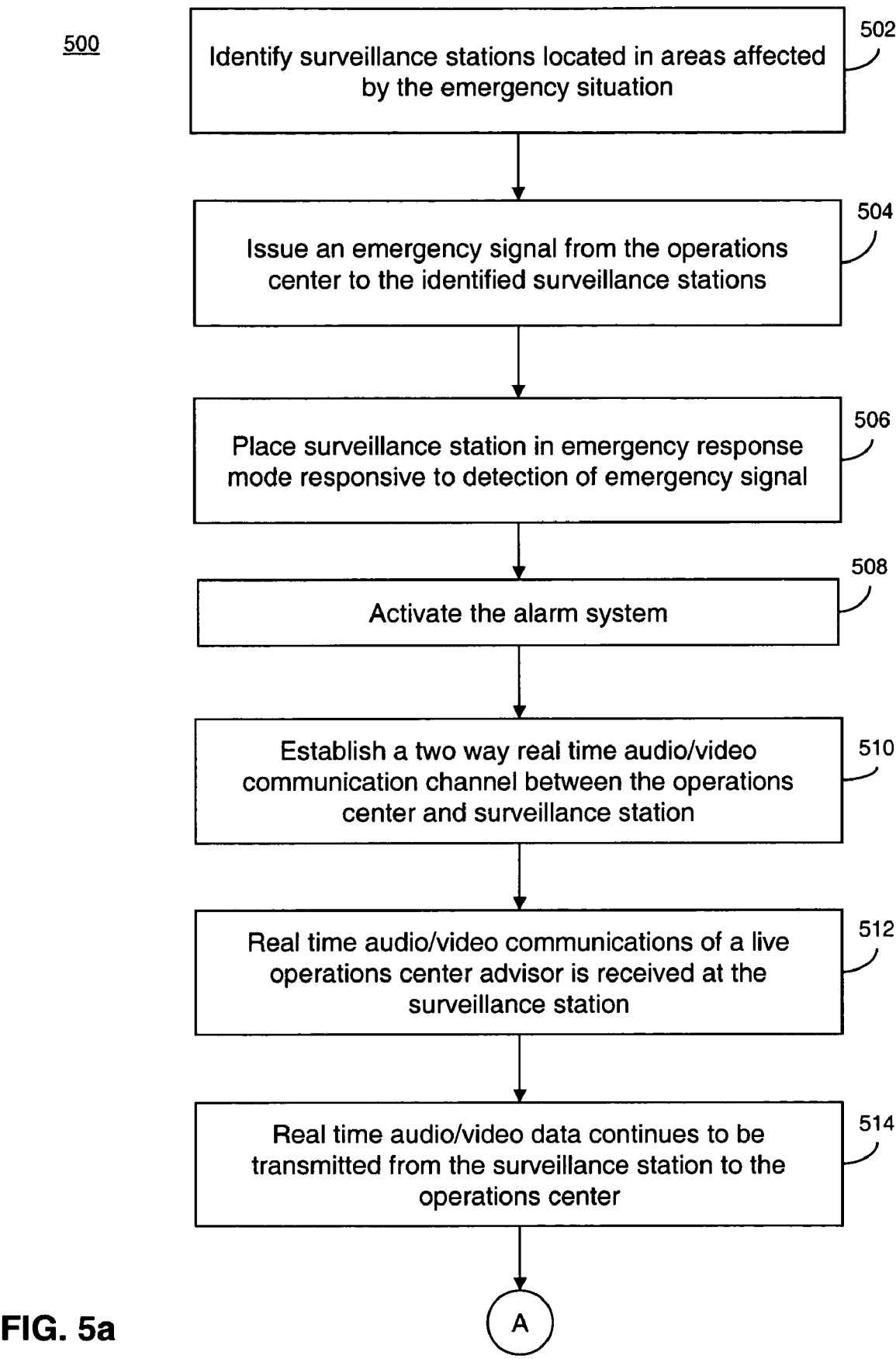
FIG. 5 a-b is a flowchart of one embodiment of a method of operating the surveillance station in emergency response mode in accordance with the principles of the present invention.
Figure 5B:
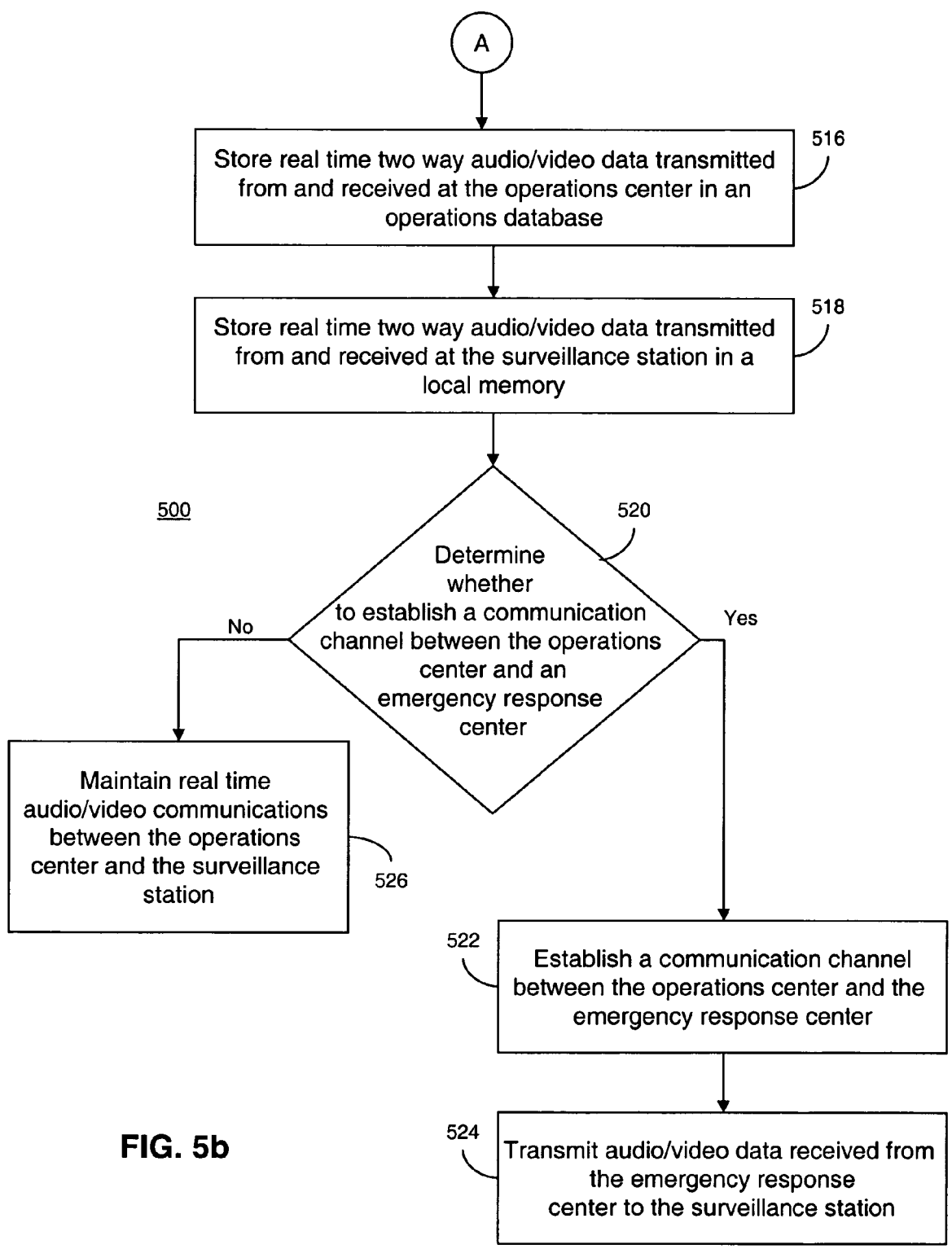

Referring to FIG. 5a-b, a flowchart of one embodiment of a method of operating the surveillance station 102 in emergency response mode 500 in accordance with the principles of the present invention is shown. In the event of an emergency situation, the method 500 begins at step 502 with the operations center 104 identifying the surveillance stations 102 located in the areas affected by the emergency situation. An emergency signal is issued to each of the identified surveillance stations 102 at step 504. When the controller 202 at each of the identified surveillance stations 102 detects the emergency signal, the controller 202 responsively places the surveillance station 102 in emergency response mode at step 506 and activates the alarm system 216 at step 508. In one embodiment, the alarm system 216 consists of a red strobe light, a blue strobe light and a siren. In one embodiment, the alarm system 216 remains activated until the surveillance station 102 is returned to surveillance mode. While one example of an alarm system 216 has been described, alternative types of alarm systems are also considered to be within the scope of the invention.

At step 510, a real time audio/video communication link is established between the surveillance station 102 and the operations center 104 to enable the transmission of real time audio/video data from the operations center 104 to the surveillance station 102 thereby creating a two way real time audio/video communication channel between the surveillance station 102 and the operations center 104. At step 512, the live real time audio/video data of the operations center advisor received from the operations center 104 at the surveillance station 102 is displayed on the display screen 208 and transmitted via the speakers 214. This permits the people at the surveillance station 102 to hear and see the operations center advisor at the operations center 104 via the display screen 208 and the speakers 214 on a real time basis.

At step 514, live real time audio/video data picked up by the video camera 210 and the microphone 212 continues to be transmitted from the surveillance station 102 to the operations center 104. The real time audio/video data received at the operations center 104 is routed to an operations advisor station 306 and displayed on the display screen 312 and transmitted via the speakers 316. The operations center advisor at the operations center 104 can hear and see the people in the vicinity of the surveillance station 102 on a real time basis.

The real time two-way audio/video communication channel permits the operations center advisor at an operations center 104 to communicate directly with the people in the vicinity of the surveillance station 102. This permits the operations center advisor to evaluate the emergency situation at the surveillance station 102 and provide the people in the vicinity of the surveillance station 102 with the appropriate guidance based on the received feedback.

At step 516. the real time audio/video data transmitted from and received at the operations center 104 is stored in the operations database 305 and at step 518, the real time audio/video data transmitted from and received at the surveillance station 102 is stored in the local memory 204. This preserves a record of all communications between the operations center 104 and surveillance stations 102 for future assessment and review.

At step 520, the operations center advisor at the operations center 104 determines whether to establish a communication channel between the operations center 104 and an emergency response center 106. In the event of a widespread emergency situation, such as for example, an earthquake, a hurricane, a tornado or a terrorist attack, emergency response agencies, such as for example The Department of Homeland Security, may take a more active role in informing and guiding people to safety. If the operations center 104 determines that an emergency response center 106 may be better equipped to guide people to safety, the operations center advisor establishes a communication channel between the operations center 104 and the appropriate emergency response center 106 at step 522 such that the operations center 104 is able to receive real time audio/video transmissions from the emergency response center 106.

At step 524, the audio/video transmissions received from the emergency response center 106 at the operations center 104 are transmitted from the operations center 104 to the surveillance stations 102. The controller 202 displays the received audio/video data on the display screen 208 and transmits the audio via the speakers 214. Thus people in the vicinity of the surveillance station 102 are provided with the latest status of the emergency situation as well as guidelines for dealing with the emergency situation.

If the operations center advisor determines that it is unnecessary to establish a communication channel between the operations center 104 and an emergency response center 106, two way real time audio/video communications are maintained between the operations center 104 and the surveillance station 102 and the operations center advisor continues to provide emergency situation specific guidance to the people in the vicinity of the surveillance station at step 526.

While a particular sequence of steps have been described above, it should be noted that a method 500 having substantially similar steps or steps in a different sequence are also considered to be within the scope of the invention.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

The invention claimed is:

1. A surveillance station comprising:
    a controller operable to place the surveillance station in one of a surveillance mode and an emergency response mode;
    a video camera communicatively coupled to the controller;
    a communication module communicatively coupled to the controller, the communication module being operable to transmit real time video data from the video camera to an operations center in both the surveillance mode and the emergency response mode and to receive real time video data from the operations center in emergency response mode; and
    a display screen communicatively coupled to the controller, the display screen being operable to display the received real time video data in emergency response mode.

2. The surveillance station of claim 1, wherein the controller is operable to place the surveillance station in surveillance mode as a default mode.

3. The surveillance station of claim 1, wherein the controller is operable to display user interest data on the display screen in the surveillance mode.

4. The surveillance station of claim 1, wherein the controller is operable to display a notification message received from the operations center on the display screen in the surveillance mode.

5. The surveillance station of claim 4, further including an alarm system communicatively coupled to the controller, wherein the controller is operable to activate the alarm system responsive to receiving the notification message.

6. The surveillance station of claim 1, further comprising a local memory communicatively coupled to the controller and operable to store the real time video data recorded by the video camera and the real time video data received at the communication module in emergency response mode.

7. The surveillance station of claim 1, wherein the real time video data received from the operations center comprises real time video of an operations center advisor.

8. The surveillance station of claim 1, wherein the operations center is communicatively coupled to an emergency response center.

9. The surveillance station of claim 8, wherein the real time video data received at the surveillance station in emergency response mode comprises real time video data from the emergency response center.

10. The surveillance station of claim 9, wherein the real time video data received at the surveillance station in emergency response mode comprises real time video data from the emergency response center routed to the surveillance station via the operations center.

11. The surveillance station of claim 1, further comprising: a microphone communicatively coupled to the communication module, wherein the communication module is operable to transmit real time audio data received at the microphone to the operations center; and a speaker communicatively coupled to the communication module, wherein the speaker is operable to transmit real time audio data received from the operations center at the surveillance station.

12. The surveillance station of claim 11, wherein the audio data received at the surveillance station from the operations center is audio data routed from an emergency response center to the surveillance station via the operations center.

13. The surveillance station of claim 11, further comprising a local memory communicatively coupled to the controller and operable to store the real time audio data received at the microphone and the real time audio data received at the communication module in emergency response mode.

14. The surveillance station of claim 1, further including a back up power source operable to power the surveillance station responsive to a failure of a primary power source.

15. The surveillance station of claim 1 wherein the communications module transmits the real time video data to the operations center and receives real time video data from the operations center via a communication system, wherein the communication system is selected from the group consisting of a satellite communication system, a T1 line system, a T3 line system, an OC3 fiber system, an OC12 fiber system, an OC48 fiber system, an OC192 fiber system, and a DSL system.

16. A method of responding to an emergency situation using a surveillance station, the method comprising:
    placing a surveillance station in one of a surveillance mode and an emergency response mode;
    transmitting real time video data from the surveillance station to an operations center in both the surveillance mode and the emergency response mode;
    receiving real time video data from the operations center at the surveillance station in emergency response mode; and
    displaying the received real time video data on a display screen at the surveillance station in emergency response mode.

17. The method of claim 16, further comprising placing the surveillance station in surveillance mode as a default mode.

18. The method of claim 16, further comprising displaying user interest data on the display screen in surveillance mode.

19. The method of claim 16, further comprising displaying a notification message received from an operations center on the display screen in surveillance mode.

20. The method of claim 19, further comprising activating the alarm system responsive to receiving the notification message.

21. The notification message of claim 19 further comprising displaying the notification message as a running footer on a lower section of the display screen.

22. The method of claim 16, further comprising storing the real time video data recorded at the surveillance station and the real time video data received at the surveillance station in emergency response mode in a local memory.

23. The method of claim 16, further comprising storing the real time video data received from the surveillance station and the real time video transmitted to the surveillance station in an operations center database.

24. The method of claim 16, further comprising: placing the surveillance station in emergency response mode; and establishing a communication channel between the surveillance station and a emergency response center.

25. The method of claim 24 further comprising receiving video data from the emergency response center at the surveillance station via the operations center.

26. The method of claim 16, further comprising: transmitting real time audio data from the surveillance station to the operations center; and receiving real time audio data from the operations center at the surveillance station in emergency response mode.

27. The method of claim 26, further comprising storing the real time audio data transmitted from the surveillance station and the real time audio data received at the surveillance station in a local memory in emergency response mode.

28. The method of claim 26, further comprising storing the real time audio data received from the surveillance station and the real time audio data transmitted to the surveillance station in an operations center database in emergency response mode.

29. The method of claim 16, further comprising activating a back up power source operable to power the surveillance station responsive to a failure of a primary power source.

30. A computer readable medium storing a computer program for responding to an emergency situation using a surveillance station, comprising:
    computer readable code for placing a surveillance station in one of a surveillance mode and an emergency response mode;
    computer readable code for transmitting real time video data from the surveillance station to an operations center in both the surveillance mode and the emergency response mode;
    computer readable code for receiving real time video data from the operations center at the surveillance station in emergency response mode; and
    computer readable code for displaying the received real time video data on a display screen at the surveillance station in emergency response mode.

31. The computer readable medium of claim 30, further comprising computer readable code for placing the surveillance station in surveillance mode as a default mode.

32. The computer readable medium of claim 30, further comprising computer readable code for displaying user interest data on the display screen in surveillance mode.

33. The computer readable medium of claim 30, further comprising computer readable code for displaying a notification message received from the operations center on the display screen in surveillance mode.

34. The computer readable medium of claim 33, further comprising computer readable code for activating an alarm system responsive to receiving the notification message.

35. The computer readable medium of claim 30, further comprising computer readable code for storing the real time video data recorded at the surveillance station and the real time video data received at the surveillance station in emergency response mode in a local memory.

36. The computer readable medium of claim 30, further comprising computer readable code for storing the real time video data received from the surveillance station and the real time video transmitted to the surveillance station in emergency response mode in an operations center database.

37. The computer readable medium of claim 30, further comprising: computer readable code for placing the surveillance station in emergency response mode; and computer readable code for establishing a communication channel between the surveillance station and an emergency response center via the operations center.

38. The computer readable medium of claim 30, further comprising: computer readable code for transmitting real time audio data from the surveillance station to the operations center; and computer readable code for receiving real time audio data from the operations center at the surveillance station in emergency response mode.

39. The computer readable medium of claim 38, further comprising: computer readable code for storing the real time audio data transmitted from the surveillance station during emergency response mode in a local memory; and computer readable code for storing the real time audio data received at the surveillance station in the local memory in emergency response mode.

40. The computer readable medium of claim 38, further comprising: computer readable code for storing the real time audio data received from the surveillance station at the operations center in an operations center database when the surveillance station is in emergency response mode; and computer readable code for storing the real time audio transmitted from the operations center to the surveillance station in the operations center database when the surveillance station is in emergency response mode.

41. The computer readable medium of claim 30, further comprising computer readable code for activating a back up power source operable to power the surveillance station responsive to a failure of a primary power source.

42. A real time emergency response surveillance system, the system comprising:

a plurality of surveillance stations each of the plurality of surveillance station being operable to be individually and selectively placed in one of an emergency response mode and a surveillance mode; and an operations center communicatively coupled to the plurality of surveillance stations, wherein a first of the plurality of surveillance stations is operable to transmit real time video data from the first surveillance station to an operations center in both the emergency response mode and the surveillance mode, and wherein the first surveillance station is operable to receive real time video data from the operations center in emergency response mode.

43. The real time emergency response surveillance system of claim 42, wherein the operations center selectively issues an emergency signal to one or more of the plurality of surveillance station in the event of an emergency situation.

44. The real time emergency response surveillance system of claim 43, wherein the surveillance station is placed in emergency response mode responsive to the emergency signal received from the operations center.

45. The real time emergency response surveillance system of claim 42, wherein the operations center is communicatively coupled to an emergency response center.

46. The real time emergency response surveillance system of claim 45, wherein the operations center is operable to establish a communication link between each of the plurality of surveillance stations and an emergency response center when each of the plurality of surveillance stations is in emergency response mode.

47. The real time emergency response surveillance system of claim 45, wherein real time video data is transmitted from the emergency response center to each of the plurality of surveillance stations via the operations center.

48. The real time emergency response surveillance system of claim 44, wherein the first surveillance stations is operable to transmit real time audio data from the first surveillance station to an operations center in both the emergency response mode and the surveillance mode, and wherein the first surveillance station is operable to receive real time audio data from the operations center in emergency response mode.

* * * * *